United States Patent
Kumar et al.

(10) Patent No.: US 10,389,882 B2
(45) Date of Patent: Aug. 20, 2019

(54) ARTIFICIAL INTELLIGENCE (AI)-ASSISTED CONFERENCE SYSTEM

(71) Applicant: Brillio LLC, Edison, NJ (US)

(72) Inventors: Arun Kumar Vijaya Kumar, Bangalore (IN); Jinu Isaac Kuruvilla, Bangalore (IN); Renji Kuruvilla Thomas, Bangalore (IN); Karthik Gopalakrishnan Vinmani, Bangalore (IN)

(73) Assignee: BRILLIO, LLC, Edison, NJ (US)

( * ) Notice: Subject to any disclaimer, the term of this patent is extended or adjusted under 35 U.S.C. 154(b) by 0 days.

(21) Appl. No.: 15/910,434

(22) Filed: Mar. 2, 2018

(65) Prior Publication Data
US 2019/0028591 A1     Jan. 24, 2019

(30) Foreign Application Priority Data
Jul. 21, 2017    (IN) .............................. 201741026032

(51) Int. Cl.
| H04M 3/56 | (2006.01) |
| G06F 9/54 | (2006.01) |
| G10L 25/51 | (2013.01) |
| H04M 7/00 | (2006.01) |

(52) U.S. Cl.
CPC ............ H04M 3/563 (2013.01); G06F 9/547 (2013.01); G10L 25/51 (2013.01); H04M 7/0012 (2013.01); H04M 2242/08 (2013.01)

(58) Field of Classification Search
None
See application file for complete search history.

(56) References Cited

U.S. PATENT DOCUMENTS

| 6,549,937 B1* | 4/2003 | Auerbach | H04L 29/06 709/206 |
| 7,503,007 B2 | 3/2009 | Goodman et al. | |
| 8,682,918 B2 | 3/2014 | Ramanujam | |
| 9,367,824 B2 | 6/2016 | Beringer et al. | |
| 9,432,517 B2 | 8/2016 | Youel et al. | |
| 9,613,636 B2 | 4/2017 | Gibbon et al. | |
| 2005/0209848 A1 | 9/2005 | Ishii | |
| 2008/0040137 A1 | 2/2008 | Lee et al. | |
| 2010/0100826 A1 | 4/2010 | Hawthorne et al. | |
| 2011/0270921 A1 | 11/2011 | Jones et al. | |
| 2013/0031187 A1 | 1/2013 | Rajesh et al. | |
| 2015/0207765 A1* | 7/2015 | Brantingham | H04L 51/046 715/758 |

(Continued)

*Primary Examiner* — Antim G Shah

(57) ABSTRACT

Embodiments herein provide a method for providing an Artificial Intelligence (AI)-assisted conference system. The method includes establishing an AI-assisted conference session with a plurality of calling applications associated with different domains. Further, the method includes determining an inactivity period in the AI-assisted conference session and recommend a topic content to the plurality of calling applications. Further, the method includes detecting a conflict between the plurality of participants associated with the plurality of calling applications and resolve the conflict using a conflict resolution. Furthermore, the method includes generating a visual artifact based on audio contents and textual contents provided by the plurality of participants during an interaction in the AI-assisted conference session.

22 Claims, 9 Drawing Sheets

(56) References Cited

U.S. PATENT DOCUMENTS

| | | | |
|---|---|---|---|
| 2015/0341498 A1* | 11/2015 | Dickins | H04M 3/2227 370/260 |
| 2016/0117624 A1 | 4/2016 | Flores et al. | |
| 2016/0125426 A1* | 5/2016 | Francolla | G06Q 30/0201 705/7.29 |
| 2016/0381416 A1 | 12/2016 | Fan et al. | |
| 2018/0287982 A1* | 10/2018 | Draeger | H04L 51/16 |

* cited by examiner

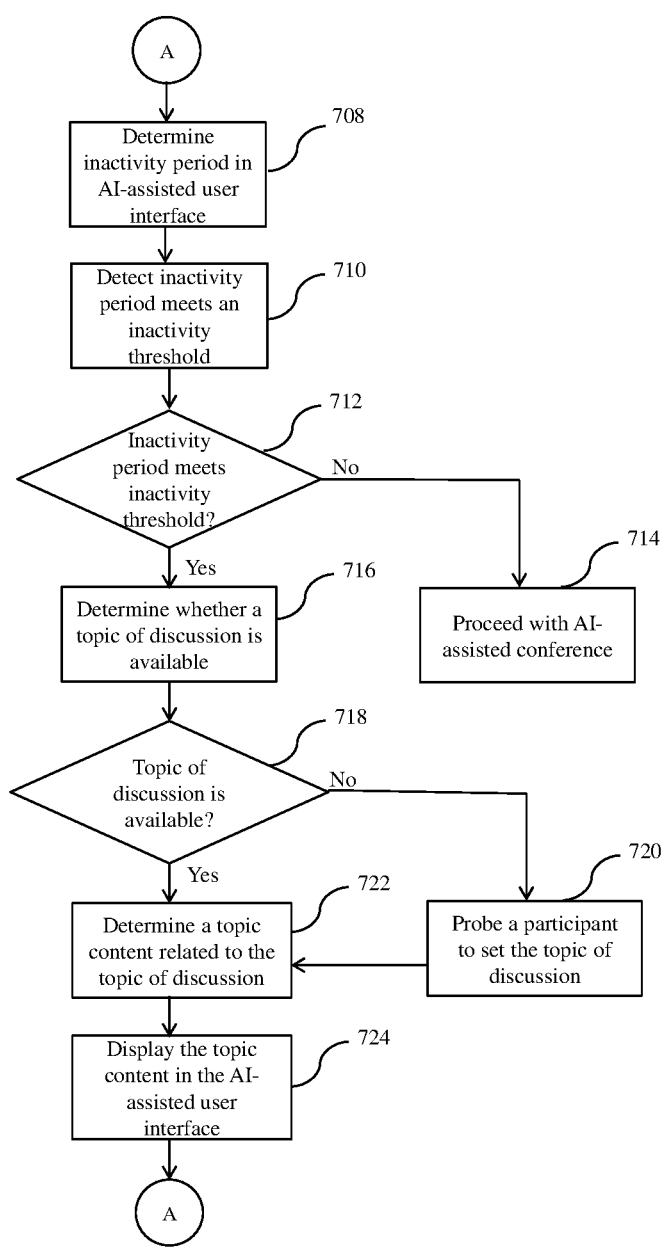

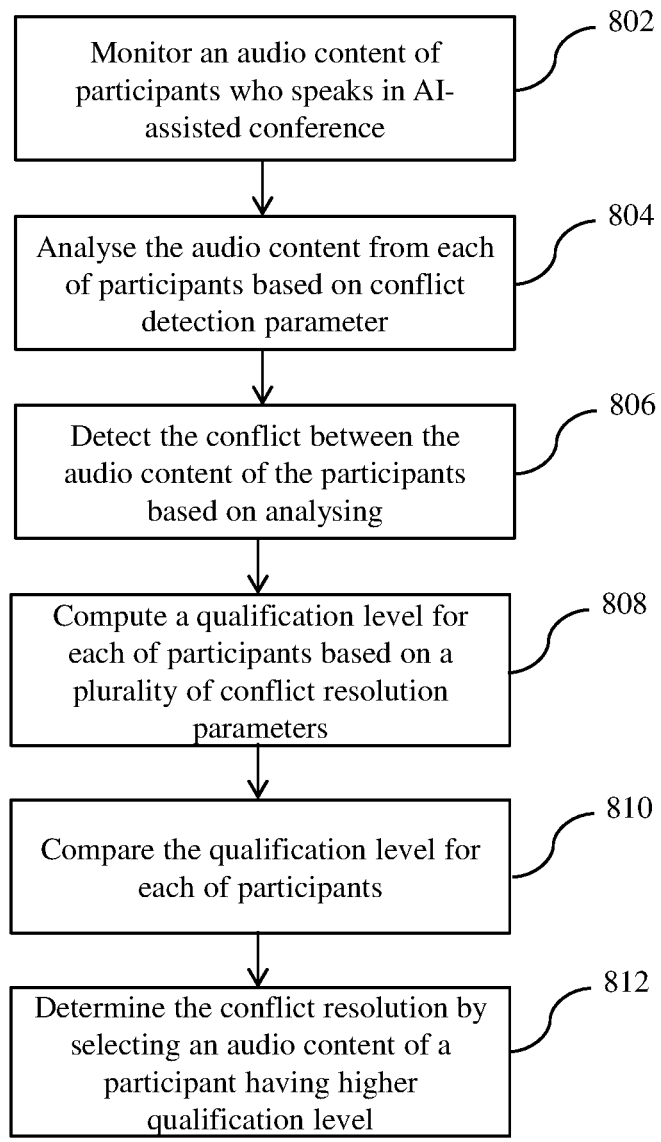

ARTIFICIAL INTELLIGENCE (AI)-ASSISTED CONFERENCE SYSTEM

TECHNICAL FIELD

The embodiments herein generally relate to conference systems. More particularly related to a method and system for providing an Artificial Intelligence (AI)-assisted conference system. The present application is based on, and claims priority from an Indian Application Number 201741026032 filed on 21 Jul. 2017, the disclosure of which is hereby incorporated by reference herein.

BACKGROUND

In general, Virtual Assistants (VAs) allows multiple participants to collaboratively interact, virtually, with each other. For e.g., the VAs can be configured to enable virtual meetings and/or virtual conferences through which multiple participants can interact (e.g. learn, discuss, etc.) using various communication tools.

There exists numerous VAs which the user can leverage thereof, however only the VAs associated with same domain can connect and/or communicate thereto. For e.g., VA associated with a domain "X" can connect and/or communicate with other VAs associated with the same domain "X", thus limiting the accessibility of other VAs associated with a different domain such as domain "Y".

Consider a scenario in which a VA of domain "X" is connected with another VA of domain "X" by establishing a virtual conference between them. During the virtual conference, a moderator (e.g., speaker, or a host) may provide a topic of discussion and invigilate the course of the ongoing discussion. Once the discussion is over, the conclusion and the outcome of the discussion have to be populated manually by the moderator according to the current systems. However, if there exists any conflict (e.g., arguments between the participants, confrontations, divergence, etc.) between the participants in the virtual conference, then the outcome and conclusion of the ongoing discussion is time consuming and/or not effective.

The above information is presented as background information only to help the reader to understand the present invention. Applicants have made no determination and make no assertion as to whether any of the above might be applicable as Prior Art with regard to the present application.

SUMMARY

Accordingly, the embodiments herein provide a method for providing an Artificial Intelligence (AI)-assisted conference system. The proposed method includes receiving, by a conference controller associated with a first domain, at least one conference request from a plurality of calling applications, where each calling application of the plurality of calling applications is associated to at least one second domain different from the first domain. Further, the proposed method includes detecting, by the conference controller, the at least one second domain associated with each of calling application of the plurality of calling applications based on the at least one conference request. Further, the proposed method includes automatically determining, by the conference controller, a domain specific an application programming interface (API) configuration for each of calling application of the plurality of calling applications based on the at least one second domain. Further, the proposed method includes establishing, by the conference controller, an AI-assisted conference session with each of calling application of the plurality of calling applications using the domain specific API configuration, where the conference controller governs the plurality of calling applications during the AI-assisted conference.

Furthermore, the proposed method includes causing, by the conference controller, to display an AI-assisted user interface displaying information about each participant associated with each of the calling applications.

In an embodiment, the conference controller governs the plurality of calling applications during the AI-assisted conference session based on a plurality of policies.

In an embodiment, the proposed method further includes determining, by the conference controller, an inactivity period in the AI-assisted user interface, detecting by the conference controller whether the inactivity period meets an inactivity threshold, automatically, by the conference controller, determining whether a topic of discussion is available, and performing, by the conference controller, one of: automatically determining a topic content related to the topic of discussion in response to determining that the topic of discussion is available.

Furthermore, the proposed method includes displaying the topic content in the AI-assisted user interface, automatically probing at least one participant in the AI-assisted user interface to set the topic of discussion in the AI-assisted conference session in response to determining that the topic of discussion is unavailable, automatically determining a topic content related to the topic of discussion, and display the topic content in the AI-assisted user interface.

In an embodiment, the topic content includes at least one of a selectable media element related to the topic of discussion and an actionable media element related to the topic of discussion. The topic content related to the topic of discussion is dynamically determined based on at least one of social handles associated with each of the participant.

In an embodiment, the at least one participant is probed by providing at least one indication in the AI-assisted user interface indicating the at least one participant to set the topic of discussion in the AI-assisted conference, the at least one participant to be probed is dynamically determined based on the social handles associated with each of the participant In an embodiment, the proposed invention further includes detecting, by the conference controller, a conflict between an audio content of at least two participants who speak in the AI-assisted conference, determining, by the conference controller, a conflict resolution to resolve the conflict based on a plurality of conflict resolution parameters, and resolving, by the conference controller, the conflict between the audio content of the at least two participants based on the conflict resolution.

In an embodiment, detecting the conflict between the audio content of the at least two participants who speak in the AI-assisted conference session includes: monitoring, by the conference controller, the audio content of participants who speaks in the AI-assisted conference, analyzing, by the conference controller, the audio content from each of the plurality of audio conference participants based on a conflict detection parameter, and detecting, by the conference controller, the conflict between the audio content of the at least two participants based on the analyzing.

In an embodiment, the conflict detection parameter includes at least one of a level of divergence in inputs provided by the participants who speaks in the AI-assisted conference, a number of opinions placed for a common topic by the participants who speaks in the AI-assisted conference, and a number of times a participant speaks with other participant in the AI-assisted conference.

In an embodiment, the plurality of conflict resolution parameters includes a participant role, a level of expertise of a participant in the topic of discussion, and a degree of relevance of input of a participant with the topic of discussion.

In an embodiment, plurality of conflict resolution parameters includes a participant role, a level of expertise of a participant in the topic of discussion, and a degree of relevance of input of a participant with the topic of discussion. The participant role is dynamically determined based on a number of references of the participant and a number of endorsement to the participant. The level of expertise of a participant in the topic of discussion is dynamically determined based on a contribution of the participant in the topic of discussion. The degree of relevance of input of a participant with the topic of discussion is dynamically determined based on alternatives of the input, a context of the topic of discussion and a context of the input of the participant. In an embodiment, the user's history in such a collaborative session (for a repeat user) is also considered as an attribute of reference.

In an embodiment, determining the conflict resolution to resolve the conflict based on the plurality of conflict resolution parameters includes: computing a qualification level for each participant of the at least one or two participants based on the plurality of conflict resolution parameters, comparing the qualification level of each participant of the at least one or two participants among each other, and determining the conflict resolution by selecting an audio content of a participant from the at least two participants that has a highest qualification level.

In an embodiment, the proposed method further includes automatically generating a visual artefact of the topic of discussion. The visual artefact includes the topic content displayed in the AI-assisted user interface and the audio content spoken by the participants in the AI-assisted conference.

In an embodiment, the proposed method further includes causing by the conference controller to display a topic content to a topic of discussion in the AI-assisted conference session selected by at least one participant in the AI-assisted conference, automatically generating, by the conference controller, a visual artefact of the topic of discussion. The visual artefact includes the topic content displayed in the AI-assisted user interface and the audio content spoken by the participants in the AI-assisted conference.

Accordingly, the embodiments herein provide a method for providing an Artificial Intelligence (AI)-assisted conference system. The proposed method includes determining, by the conference controller, an inactivity period in the AI-assisted user interface. Further, the proposed method includes detecting, by the conference controller, whether the inactivity period meets an inactivity threshold. Further, the proposed method includes automatically determining, by the conference controller, whether a topic of discussion is available. Furthermore, the proposed method includes performing, by the conference controller, a one of: automatically determine a topic content related to the topic of discussion in response to determining that the topic of discussion is available, and display the topic content in the AI-assisted user interface, and automatically probe at least one participant in the AI-assisted user interface to set the topic of discussion in the AI-assisted conference session in response to determining that the topic of discussion is unavailable, automatically determining a topic content related to the topic of discussion, and display the topic content in the AI-assisted user interface.

Accordingly, the embodiments herein provide a method for providing an Artificial Intelligence (AI)-assisted conference system. Further, the proposed method includes monitoring, by a conference controller, an audio content of participants who speaks in an AI-assisted conference. Further, the proposed method includes detecting, by the conference controller, a conflict between the audio content of the at least two participants who speaks in the AI-assisted conference. Further, the proposed method includes determining, by the conference controller, a conflict resolution to resolve the conflict based on a plurality of conflict resolution parameters. Furthermore, the proposed method includes resolving, by the conference controller, the conflict between the audio content of the at least two participants based on the conflict resolution.

Accordingly, the embodiments herein provide an Artificial Intelligence (AI)-assisted conference system including a conference application device compressing a display, a memory, a processor and a conference controller, operably coupled to the processor and the memory.

The conference controller is configured to: receive at least one conference request from a plurality of calling applications, wherein each calling application of the plurality of calling applications is associated with at least one second domain different than the first domain, detect the at least one second domain associated with each of calling application of the plurality of calling applications based on the at least one conference request, automatically determine an application programming interface configuration for each of calling application of the plurality of calling applications based on the at least one second domain, establish an AI-assisted conference session with each of calling application of the plurality of calling applications using the Application Programming Interface configuration, wherein the conference controller governs the plurality of calling applications during the AI-assisted conference session, and cause to display an AI-assisted user interface displaying information about each participant associated with each of the calling applications.

Accordingly, the embodiments herein provide an Artificial Intelligence (AI)-assisted conference system including a conference application device. The conference application device includes a display, a memory, a processor and a conference controller, operably coupled to the processor and the memory.

The conference controller is configured to: cause to display an AI-assisted user interface displaying information about participants in an AI-assisted conference, determine an inactivity period in the AI-assisted user interface, detect that the inactivity period meets an inactivity threshold, automatically determine whether a topic of discussion is available, and perform one of: automatically determine a topic content related to the topic of discussion in response to determining that the topic of discussion is available, and display the topic content in the AI-assisted user interface, and automatically probe at least one participant in the AI-assisted user interface to set the topic of discussion in the AI-assisted conference session in response to determining that the topic of discussion is unavailable, automatically determining a topic content related to the topic of discussion, and display the topic content in the AI-assisted user interface.

Accordingly, the embodiments herein provide an Artificial Intelligence (AI)-assisted conference system including a conference application device comprising a display, a memory, a processor and a conference controller, operably coupled to the processor and the memory, configured to: monitor an audio content of participants who speaks in an AI-assisted conference, detect a conflict between the audio content of the at least two participants who speaks in the AI-assisted conference, determine a conflict resolution to resolve the conflict based on a plurality of conflict resolution parameters, and resolve the conflict between the audio content of the at least two participants based on the conflict resolution.

These and other aspects of the embodiments herein will be better appreciated and understood when considered in conjunction with the following description and the accompanying drawings. It should be understood, however, that the following descriptions, while indicating preferred embodiments and numerous details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This method is illustrated in the accompanying drawings, throughout which like reference letters indicate corresponding parts in the various figures. The embodiments herein will be better understood from the following description with reference to the drawings, in which:

FIGS. 7A-7C are flow diagrams illustrating a method to provide the AI-assisted conference session with the plurality of calling devices associated with the different domains, according to an embodiment as disclosed herein; and FIG. 8 is a flow diagram illustrating a method to detect the conflict between the audio content of participants who speaks in the AI-assisted conference session and determine a conflict resolution to resolve the conflict, according to the embodiment as disclosed herein.

DETAILED DESCRIPTION OF EMBODIMENTS

Figure 1:
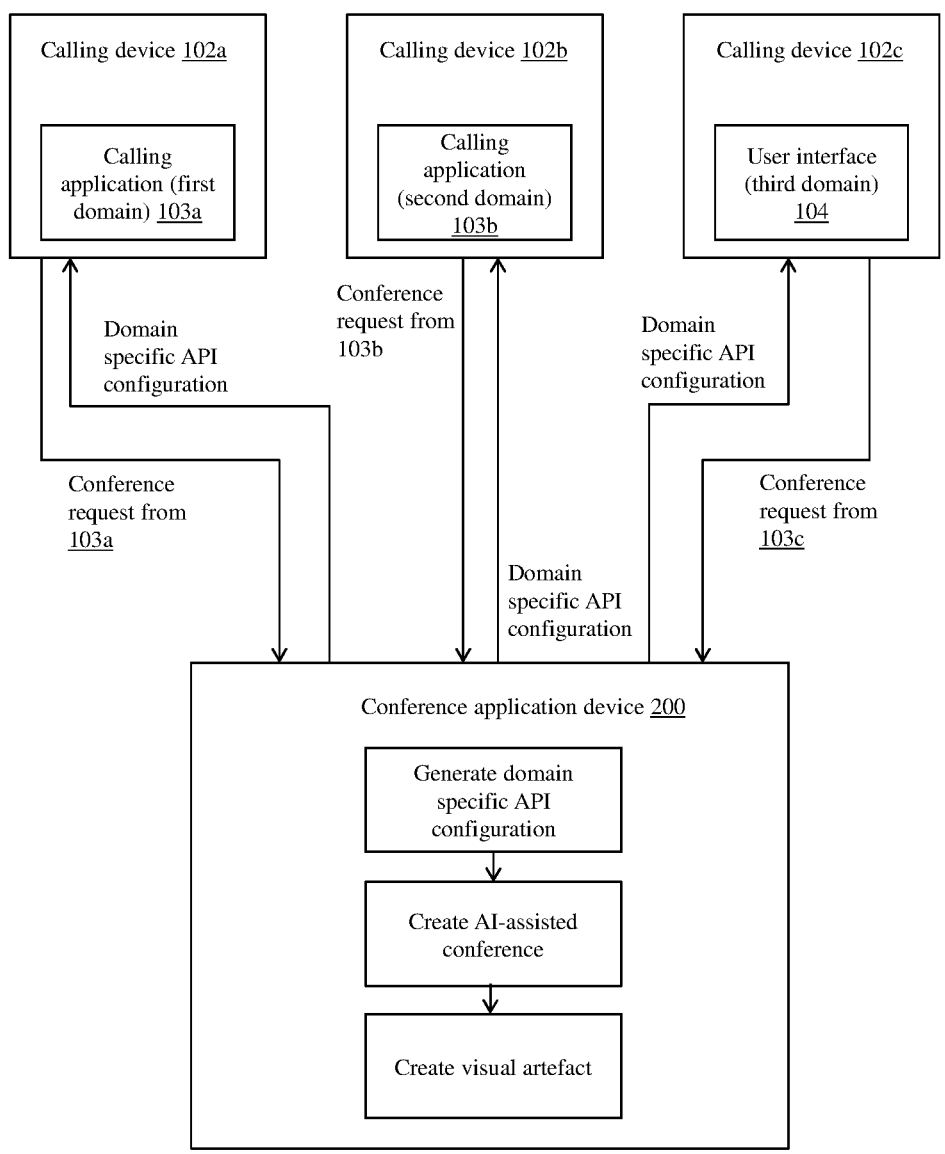
FIG. 1 illustrates an overview of a communication network in which a plurality of calling devices are communicating with a conference application device to initiate an AI-assisted conference, according to an embodiment as disclosed herein.

Various embodiments of the present disclosure will now be described in detail with reference to the accompanying drawings. In the following description, details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this invention belongs.

Calling application: also referred as a virtual assistant (VA), virtual digital assistant, virtual intelligent assistant or chatbot. The calling application can be a software running on a computing device, module, software running on a remote computing device etc. The calling application enables a user/human to interact or communicate with a machine such as a computing device using natural language. The means for communication could be textual or speech. The calling application take user inputs (speech/text) and interprets it. Further, the calling application associates actions with user inputs and carry out those actions.

Conference application: also referred as a master chatbot, a master virtual assistant, a conference monitoring software. The conference application can be an application running on an electronic device, a remote computing device, server device, module etc. The conference application can monitor a virtual conference, or a virtual meeting and provide instructions to users. Further, the conference application can communicate with various calling applications based on a conference request received from the calling applications. In another embodiment, the conference application may also be referred as, collaboration system configured to facilitate the communication collaboratively.

Accordingly, the embodiments herein provide a method for providing an Artificial Intelligence (AI)-assisted conference system. The proposed method includes receiving, by a conference controller associated with a first domain, at least one conference request from a plurality of calling applications, where each calling application of the plurality of calling applications is associated with at least one second domain different than the first domain. Further, the proposed method includes detecting, by the conference controller, the at least one second domain associated with each of calling application of the plurality of calling applications based on the at least one conference request. Further, the proposed method includes automatically determining, by the conference controller a domain specific application programming interface (API) configuration for each of calling application of the plurality of calling applications based on the at least one second domain different from the first domain. Further, the proposed method includes establishing, by the conference controller, an AI-assisted conference session with each of calling application of the plurality of calling applications using the domain specific API configuration, where the conference controller governs the plurality of calling applications during the AI-assisted conference. Furthermore, the proposed method includes causing, by the conference controller, to display an AI-assisted user interface displaying information about each participant associated with each of the calling applications.

Unlike to conventional methods and systems, the proposed method can be used to establish the AI-assisted conference session with each of calling device including a calling application associated with different domains respectively. For example, a user having a virtual assistant associated with a domain "X" can participate in an instant application group chat associated with a domain "Y". Thus, eradicating the accessibility limitation for the VAs associated with different domains.

According, the embodiments herein provide a method for providing an Artificial Intelligence (AI)-assisted conference system. The proposed method includes determining, by the conference controller, an inactivity period in the AI-assisted user interface. Further, the proposed method includes detecting, by the conference controller, that the inactivity period meets an inactivity threshold. Further, the proposed method includes automatically determining, by the conference controller, whether a topic of discussion is available. Furthermore, the proposed method includes performing, by the conference controller, a one of: automatically determine a topic content related to the topic of discussion in response to determining that the topic of discussion is available, and display the topic content in the AI-assisted user interface, and automatically probe at least one participant in the AI-assisted user interface to set the topic of discussion in the AI-assisted conference session in response to determining that the topic of discussion is unavailable, automatically determining a topic content related to the topic of discussion, and display the topic content in the AI-assisted user interface.

Unlike to conventional methods and systems, the proposed method can be used to automatically recommend the topic content to the plurality of participants in response to determining the idle state (i.e., no interaction) of the participants during the active virtual conference. Thus, enhancing a livelihood in the virtual conference by recommending the topic content to the plurality of participants when there is no interaction among the plurality of participants.

Accordingly, the embodiments herein provide a method for providing an Artificial Intelligence (AI)-assisted conference system. Further, the proposed method includes monitoring, by a conference controller, an audio content of participants who speak in an AI-assisted conference. Further, the proposed method includes detecting, by the conference controller, a conflict between the audio content of the at least two participants who speaks in the AI-assisted conference. Further, the proposed method includes determining, by the conference controller, a conflict resolution to resolve the conflict based on a plurality of conflict resolution parameters. Furthermore, the proposed method includes resolving, by the conference controller, the conflict between the audio content of the at least two participants based on the conflict resolution.

Unlike to conventional systems and methods, the proposed method can be used to determine the conflict between the participants during the interaction in the virtual conference and further resolves the conflict based on the contexts of the participants. Thus, enhancing the livelihood of the virtual conference by automatically resolving the conflicts during the interaction among the plurality of the participants.

Referring now to the drawings, and more particularly to FIGS. 1 through 8, where similar reference characters denote corresponding features consistently throughout the figures, these are shown as preferred embodiments.

FIG. 1 illustrates an overview of an Artificial Intelligence (AI)-assisted conference system 100 in which a plurality of calling devices 102a to 102c (can be also defined as calling device 102) are communicating with a conference application device 200 to initiate an AI-assisted conference, according to an embodiment as disclosed herein.

In an embodiment, the calling device 102a and the calling device 102b includes a calling application 103a and 103b (can also be defined as calling application 103) respectively. The calling application 103a and 103b are associated with different domains (i.e., for e.g., calling application 103a is associated with a first domain and the calling application 103b is associated with a second domain). The calling device 102a and 102b can be, for e.g., an electronic device, such as desktop computers, portable computers, smart phones, tablet computers, wearable devices, and the like. The calling application 103a and 103b can be, but not limited to a virtual digital assistant application, a virtual intelligent assistant application, a chatbot application or an instant messaging application, and the like.

The communication between the calling device 102a and the calling device 102b to establish a conference session with the conference application device 200 can be facilitated through a network (not shown herein). The network can be for e.g., a data network such as, but not restricted to, the Internet, local area network (LAN), wide area network (WAN), metropolitan area network (MAN) etc. In certain embodiments, the network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc.

The conference application device 200 includes a conference application management engine 211 associated with a fourth domain (not shown). In an embodiment, the conference application management engine 211 can be configured to facilitate the conference session with the calling device 102a and 102b. The conference application device 200 can be the electronic device having the conference application management engine 211. The conference application management engine 211 can be associated with an application installed in the conference application device 200. The conference application management engine 211 can be located in a server (e.g., cloud network, not shown) and the conference application device 200 can access the conference application management engine 211 through the network using the application associated with the conference application management engine 211. In another embodiment, the conference application management engine 211 can be, but not limited to a software application to monitor the virtual conference, a virtual digital assistant, a virtual intelligent assistant, a chatbot to monitor the virtual conference.

The conference application device 200 can include a communicator (not shown) that can be configured to receive and transmit conference requests and/or communication responses to the calling device 102a and the calling device 102b. The conference application device 200 can be one of or a combination of a centralized computer network, a local computer connected to the communication network or another mobile device connected to the communication network.

In an embodiment, the conference application device 200 can be configured to receive the conference request from each of the calling device 102a and the calling device 102b. The conference request can be, but not limited to a notification, a query, a message to obtain a domain specific API configuration from the conference application device 200, etc. Further, the conference application device 200 can be configured to provide a login interface (not shown) to the calling device 102a and the calling device 102b based on the received conference request. The login interface includes login credentials in which the participant can enter the login information for authentication.

Further, the conference application management engine 211 can be configured to determine an authorization of the calling device 102a and 102b and if the authorization of the calling device 102a and 102b is verified then the conference application management engine 211 initiates the AI-assisted conference session by determining the domain specific API configuration for the calling device 102a and the calling application 103b. The domain specific API configuration includes an AI-assisted user interface (i.e., conference application user interface) in which the plurality of participants can interact with each other.

For e.g., the calling device 102c associated with a third domain, can also send a request to the conference application device 200 through any online user interface for e.g., a browser application, or any online cloud application. Further, the conference application device 200 can be configured to provide a login interface (not shown) to the calling device 102c and generate the domain specific API configuration for the calling device 102c in which the participant of the calling device 102c can interact with the other participants.

Unlike the conventional methods and systems, the conference application device 200 associated with the fourth domain is configured to establish the AI-assisted conference session with the calling device 102a to 102c each associated with the different domains.

In an embodiment, when the authorization of the calling device 102 is verified, then the conference application device 200 is configured to create a visual artefact based on the context of the AI-assisted conference session and the context of the participants.

Figure 2:
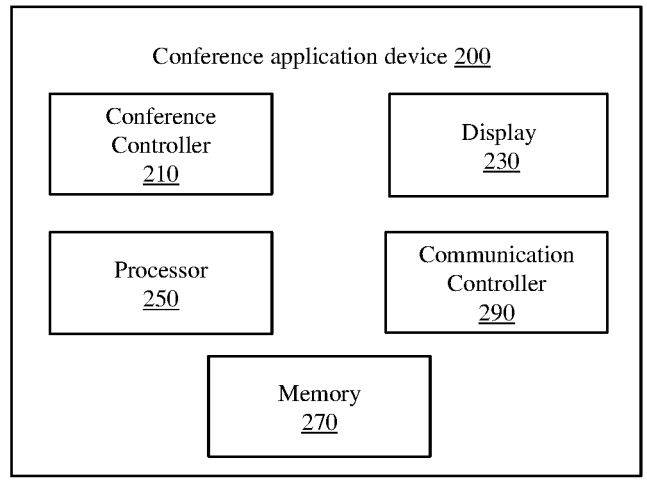
FIG. 2 is a block diagram illustrating various hardware components of the conference application device, according to an embodiment as disclosed herein.

FIG. 2 illustrates a block diagram illustrating various hardware components of the conference application device 200, according to an embodiment as disclosed herein. The conference application device 200 includes a conference controller 210, a display 230, a processor 250, a memory 270 and a communication controller 290.

The conference controller 210 is communicatively coupled to the display 230 and the processor 250. The conference controller 210 verifies the authorization of calling device 102 associated with the different domain and controls the AI-assisted conference session by resolving a conflict among the plurality of participants in the AI-assisted conference session and further, create a visual artefact based on the interaction among the plurality of participants.

The functionality of the conference controller 210 is detailed in conjunction with FIG. 3, described below.

The display 230 used to display a user interface on a screen of the conference application device 200. The display 170 can be, but not limited to, a Cathode Ray Tube (CRT), a Liquid Crystal Display (LCD), Organic Light-Emitting Diode (OLED), a Light-emitting diode (LED), Electroluminescent Displays (ELDs), field emission display (FED). The user input can be, but not limited to a textual input, a voice input, a sketch input. The processor 250 performs actions based on the instructions provided by the conference controller 210, the display 230, and the communication controller 290. The processor 250 are not limited to a hardware unit, an apparatus, a Central Processing Unit (CPU), a Graphics Processing Unit (GPU).

The memory 270 includes storage locations to be addressable through the processor 250. The memory 270 is not limited to a volatile memory and/or a non-volatile memory. Further, the memory 270 can include one or more computer-readable storage media. The memory 270 may include non-volatile storage elements. For example, non-volatile storage elements may include magnetic hard discs, optical discs, floppy discs, flash memories, or forms of electrically programmable memories (EPROM) or electrically erasable and programmable (EEPROM) memories. In some examples, the memory 270 can be configured to store larger amount of applications (i.e. Virtual assistants, or calling applications) stored therein to provide one or more services to the user. Further, the memory 270 can also temporarily store the requests from the calling application 103.

The communication controller 290 communicates with the calling device 102 via conventional means such as Wi-Fi, Bluetooth, Zig-bee or any wireless communication technology and furthermore, it can also communicate internally between the various hardware components of the conference application device 200. The communication controller 290 is communicatively coupled to both the display 230 and the processor 250.

Unlike to the conventional methods and conventional systems, the conference application device 200 includes the conference controller 210 configured to establish the AI-assisted conference session with the calling device 102 having the calling application 103 associated with the different domains.

The FIG. 2 shows the various hardware components of the conference application device 200 but it is to be understood that other embodiments are not limited therein. In other embodiments, the conference application device 200 may include less or more number of units. Further, the labels or names of the units are used only for illustrative purpose and does not limit the scope of the invention. One or more units can be combined together to perform same or substantially similar function in the conference application device 200.

Figure 3:
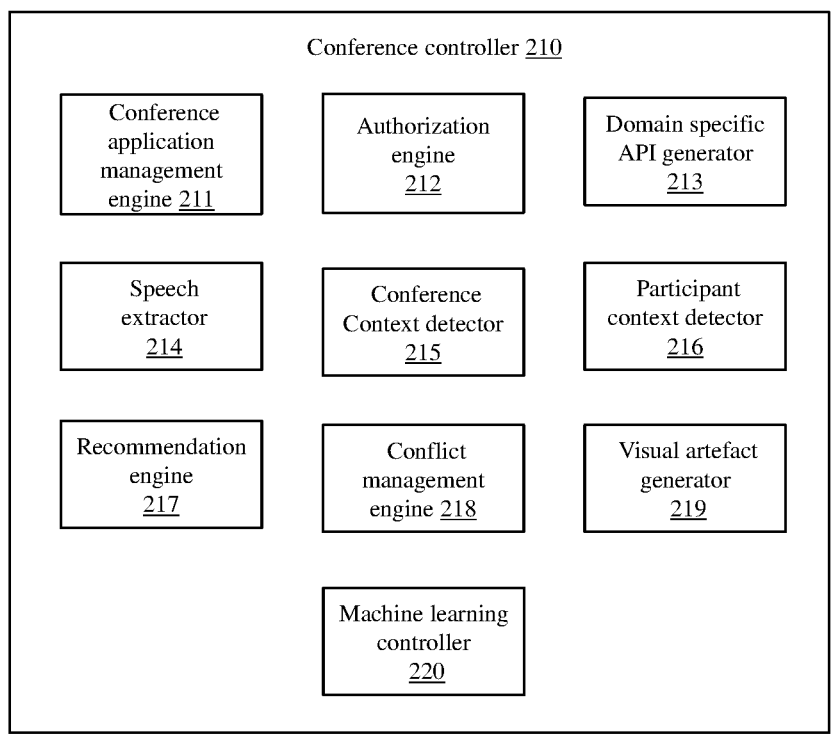
FIG. 3 is a block diagram illustrating various hardware components of a conference controller, according to an embodiment as disclosed herein.

FIG. 3 is a block diagram illustrating various hardware components of the conference controller 210, according to an embodiment as disclosed herein. The conference controller 210 includes a conference application management engine 211, an authorization engine 212, a domain specific Application Program Interface (API) generator 213, a speech extractor 214, a conference context detector 215, a participant context detector 216, a recommendation engine 217, a conflict management engine 218, a visual artefact generator 219, and a machine learning controller 220.

The conference application management engine 211 receives a conference request from the calling device 102 through the communication controller 290. The authorization engine 212 determines whether the calling device 102 and the received conference request are authorized (i.e., logged-in successfully through the login interface, login credentials, etc.) to participate in the AI-assisted conference. Further, the conference application management engine 211 governs the plurality of calling applications during the AI-assisted conference session based a plurality of policies. For e.g., the policies could be role based/pre-determined user privileges or the user privileges that are determined in real time. In an embodiment, polices can be Pre-determined user policies and the determined user policies.

The Pre-determined user policies are role based privileges that are shared prior to the collaboration session. For e.g., Persona based privileges of the users like Super Admin, Normal user etc., hierarchical based privileges of the users like, Senior Architect, Architect etc., and Role based privileges of the users like Program Manager, Delivery Manager etc. The determined user policies are policies that determine the expertise of the user at real time. Examples of the determined user policies can be expertise based privileges of the user like inferred expertise on the subject/topic of discussion based on the contributions/internet based references/citations of/for each user, relevance of contribution of the users (users who are more scoped with the topic/discussion are given a higher preference than a user who is not scoped on the topic of discussion). In another embodiment, divergent views are considered and appreciated, however, relevance of topic is key. In absence of a topic/discussion the determined user policies does not apply for the users.

The above policies are leveraged to map all users in the session and are graded at real time. At any given point there could be one or more users who are determined as key users in the discussion.

When the calling device 102 is authorized, the domain specific API generator 213 automatically determines an application programming interface (API) configuration for each of calling application of the plurality of calling applications 103a-103c based on each domain associated therewith. The domain specific API configuration includes an AI-assisted user interface which is displayed on the screen of the calling device 102 and the conference application device 200. The participants can interact with the other participants through the AI-assisted user interface. For example, the participants can provide the textual inputs, the voice inputs, or attach any electronic files, sketches in the AI-assisted user interface to interact with the other participants.

In another embodiment, the domain specific API generator 213 determines the domain specific API configuration for the participants who does not use the calling application 103. For example, the domain specific API generator 213 determines the domain specific API configuration that includes the AI-assisted user interface and display the AI-assisted user interface on the screen of the calling device 102 via the browser application. Further, the conference controller 210 establish the AI-assisted conference session by establishing a conference call to the calling device 102.

The speech extractor 214 extracts media contents which is not limited to audio from the participants in the AI-assisted conference session in real-time. In an embodiment, the speech extractor 214 can also extract the media contents from the memory 270 which are temporarily stored for a future purpose.

The conference context detector 215 determines the context of the AI-assisted conference session by determining whether the interaction among the participants in the AI-assisted conference session is active or inactive based on a real-time analysis, and/or past happenings. For example, when there is no interaction among the participants in the AI-assisted conference, the conference context detector 215 detects the interaction among the participants as inactive and further determines an availability of a topic of discussion in the AI-assisted conference.

The participant context detector 216 dynamically determine a participant context such as a role of the participant, a level of expertise and a degree of relevance input provided by the participant associated with the calling device 102 in the AI-assisted conference. The participant context detector 216 dynamically determines the role of each participants based on a number of references of the participant and a number of endorsement to the participant. For example, if any one of the participant has worked in a company for more years, then the participant context detector 216 determines that the participant's role as a senior level.

In an embodiment, the participant context detector 216 dynamically determines the level of expertise of each participant based on a contribution of the participant in the topic of discussion. For example, if any one of the participant provide more details related to the topic of discussion, then the participant context detector 216 determines that the level of expertise of the participant is in a highest qualification level.

In an embodiment, the participant context detector 216 dynamically determines the degree of relevant input provided by each of participant based on alternatives of the input, a context of the topic of discussion and a context of the input of the participant. For example, if any one of the participant provide relevant information related to the topic of discussion, then the participant context detector 216 determines that the degree of relevant input provided by the participant is in the highest qualification level.

The recommendation engine 217 determines a topic content (e.g., a selectable media element and an actionable media element) related to the topic of discussion, if the topic of discussion is available. In case the topic of discussion is not available, the recommendation engine 217 automatically probes any one of the participants in the AI-assisted user interface to set the topic of discussion in the AI-assisted conference. Further the recommendation engine 217 recommends the topic content to the participants through the AI-assisted user interface which is displayed on the screen of the calling device 102. For example, if the topic of discussion is based on "Cars", then the recommendation engine 217 recommends the topic content as "Cars" to the participants through the AI-assisted user interface.

In an embodiment, the topic content related to the topic of discussion is dynamically determined based on at least one of social media handles associated with each of the participant, references made to the user based on a user profile or references made to a user based on the past collaborative sessions with one or more users.

The conflict management engine 218 detects a conflict between the audio contents of the participants who speaks in the AI-assisted conference. The conflict management engine 218 detects the conflict based on a conflict detection parameter. The conflict detection parameter can be any one of a level of divergence in inputs provided by the participants who speaks in the AI-assisted conference, a number of opinions placed for a common topic by the participants who speaks in the AI-assisted conference, and a number of times a participant speaks with other participants in the AI-assisted conference.

If the conflict management engine 218 detects the conflict between the audio contents of the participants based on the conflict detection parameter, further the conflict management engine 218 determines a conflict resolution to resolve the conflict based on a plurality of conflict resolution parameters. The plurality of conflict resolution parameters includes, for example, participant context such as a role of the participant, a level of expertise and a degree of relevance input provided by the participant associated with the calling device 102 in the AI-assisted conference session which are already determined by the participant context detector 216. The conflict management engine 218 determines the conflict resolution by computing a qualification level (e.g., a percentage, a score, or a value and like) for one or more participants by adding weightage values for the participant contexts, where the qualification level indicates an ability of the participant to resolve the conflict. Further, the conflict management engine 218 selects an audio content of the participant that has a highest qualification level to resolve the conflict.

For example, consider that the conflict management engine 218 detects the conflict between the audio contents spoken by the participants in the AI-assisted conference. The conflict management engine 218 resolves the conflict by computing the qualification level for each participant based on the participant contexts (e.g., participant role). If one or two participants are in senior level position, then the conflict management engine 218 add the weightage value for the participant context (i.e., participant role) and compute the qualification level by summing all the weightage values for the participant contexts. Finally, the conflict management engine 218 resolves the conflict by selecting the participant having the highest qualification level.

The visual artefact generator 219 generates a visual artefact of the topic being discussed based on the audio contents spoken by the participants and the topic being discussed in the discussion. The visual artefact can be, but not limited to any visual objects, UML models, flow diagrams, state diagrams, class diagrams and the like. For example, the visual artefact generator 219 generates a visual artefact such as a visual design of a car based on the audio contents spoken by the participants. The machine learning controller 220 detects whether the inactivity period of the AI-assisted conference session meets the inactivity threshold in the AI-assisted user interface.

Figure 4:
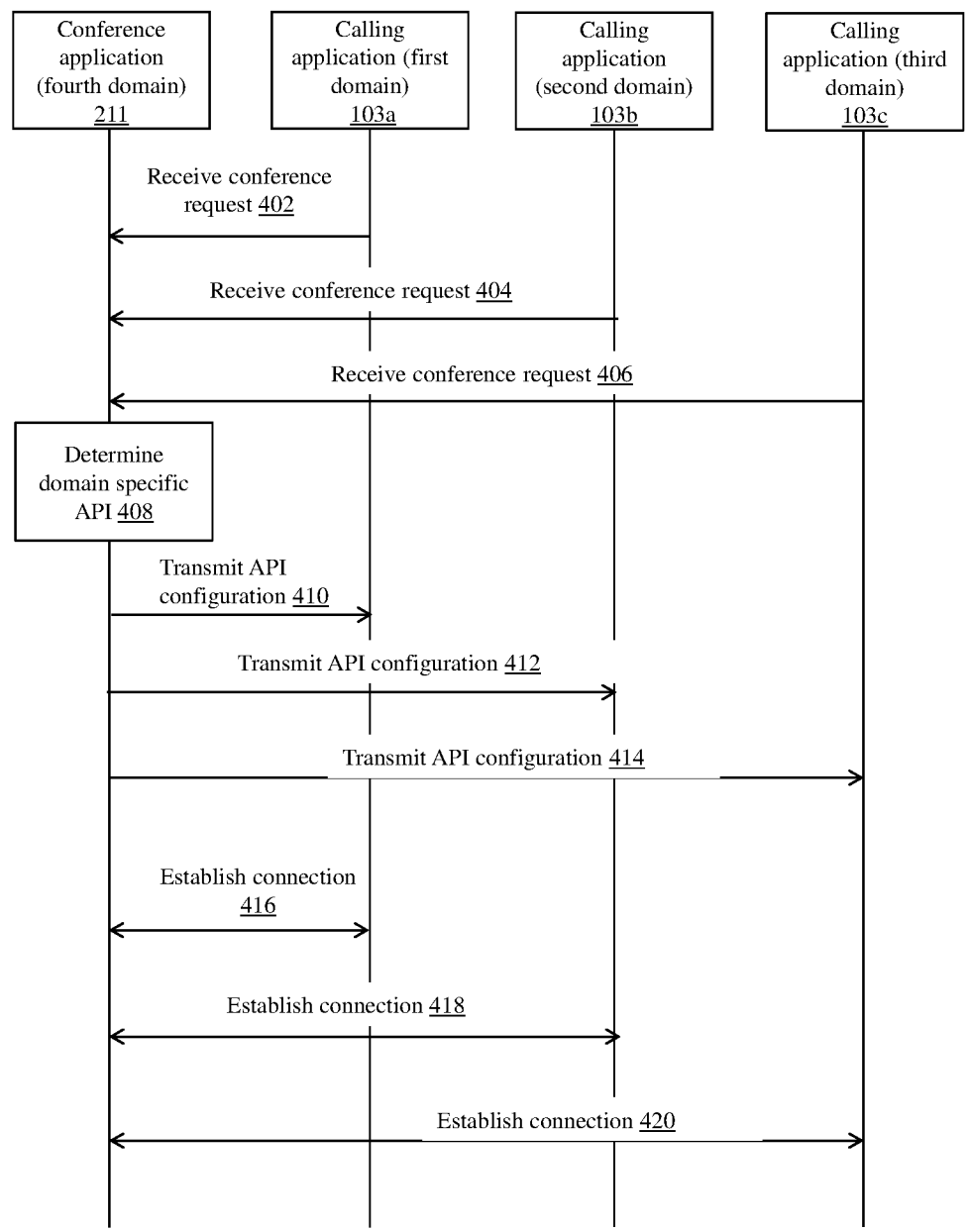
FIG. 4 illustrates a sequence diagram explaining various operations to perform the AI-assisted conference session with the plurality of calling devices associated with different domains, according to an embodiment as disclosed herein.

FIG. 4 illustrates a sequence diagram explaining various operations to perform the AI-assisted conference session with the plurality of calling devices 102a to 102c having a plurality of calling applications 103a to 103c associated with different domains, according to an embodiment as disclosed herein.

Consider a scenario that the calling application 103a to 103c associated with different domains (i.e., the calling application 103a is associated with the first domain, the calling application 103b is associated with the second domain, and the calling application 103c is associated with the third domain) communicates with the conference application management engine 211 associated with the fourth domain. At step 402, the conference application management engine 211 receives the conference request from the calling application 103a. At step 404, the conference application management engine 211 receives the conference request from the calling application 103b. At step 406, the conference application management engine 211 receives the conference request from the calling application 103c.

At step 408, the conference application management engine 211 verifies the authorization of the calling application 103a to 103c. Thereafter, the conference application management engine 211 determines the domain specific API configuration for each of the calling application 103a to 103b based on the received conference request. The domain specific API configuration includes the AI-assisted user interface. At step 410, the conference application management engine 211 transmits the domain specific API configuration associated with the calling application 103a to the calling application 103a.

At step 412, the conference application management engine 211 transmits the domain specific API configuration associated with the calling application 103b to the calling application 103b. At step 414, the conference application management engine 211 transmits the domain specific API configuration associated with the calling application 103c to the calling application 103c.

At step 416, the conference application management engine 211 establishes a connection with the calling application 103a using the domain specific API configuration associated with the calling application 103a. At step 418, the conference application management engine 211 establishes a connection with the calling application 103b using the domain specific API configuration associated with the calling application 103b. At step 420, the conference application management engine 211 establishes a connection with the calling application 103c using the domain specific API configuration associated with the calling application 103c.

For example, consider the plurality of participants using a plurality of chatbots or virtual assistants send the conference request to a master chatbot for establishing a virtual conference (e.g. conference request could be about creating a structural design of a car). The plurality of chatbots are from different domains such as (e.g., Skype, Citrix etc.). After receiving the conference request, the master chatbot determines whether the plurality of chatbots from different platforms are authorized to attend the virtual conference. After verifying that the plurality of chatbots are authorized, the master chatbot establishes a virtual conference by creating the AI-assisted user interface (i.e., conference application user interface). The AI-assisted user interface is then displayed on both the plurality of chatbots and the master chatbot in which the plurality of participants interact with each other through the AI-assisted user interface.

Figure 5:
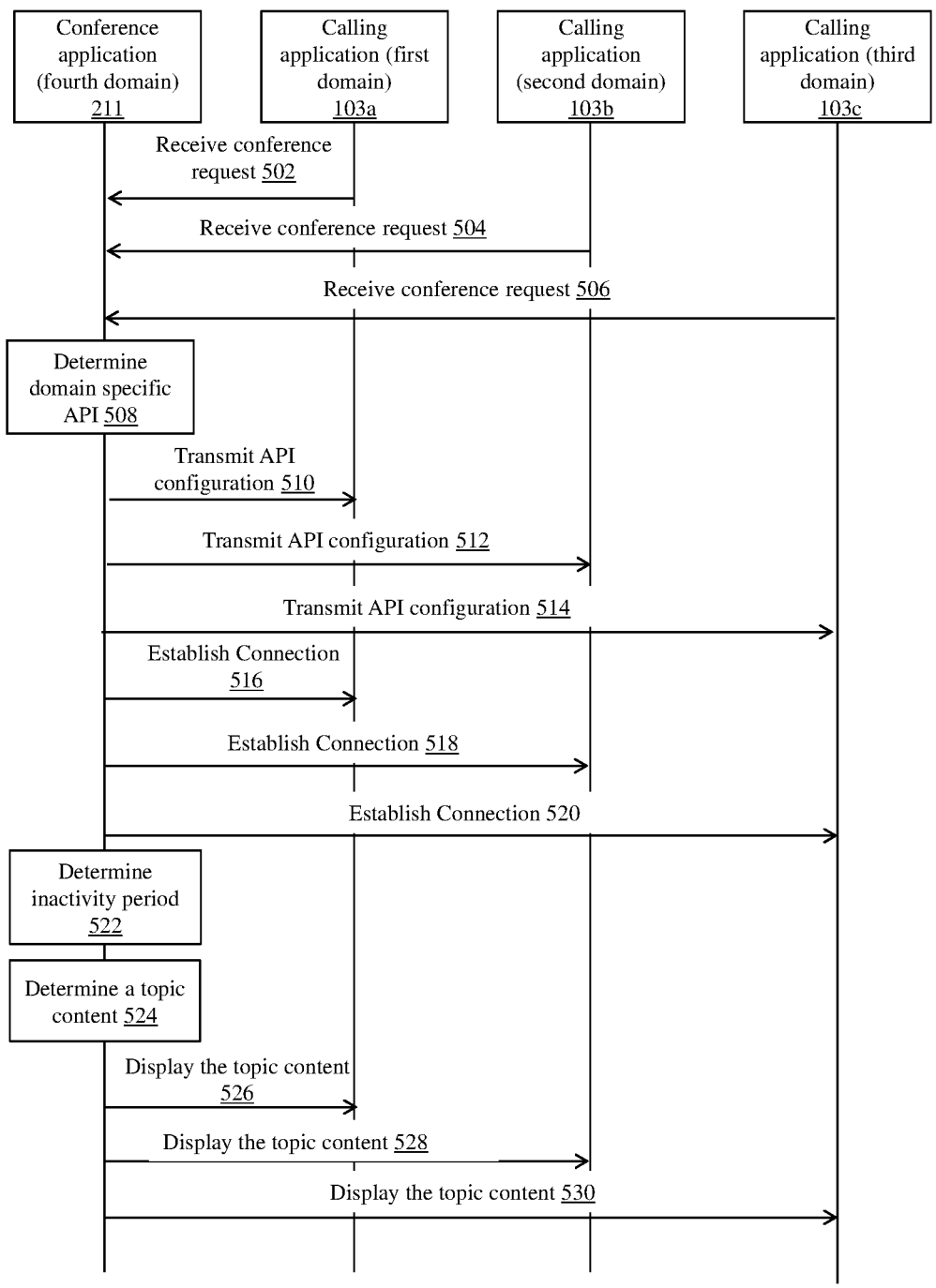
FIG. 5 illustrates a sequence diagram explaining various operations to determine an inactivity period of the plurality of calling applications in the AI-assisted conference, according to an embodiment as disclosed herein.

FIG. 5 illustrates a sequence diagram explaining various operations to determine an inactivity period of the plurality of calling applications 103a to 103c in the AI-assisted conference, according to an embodiment as disclosed herein;

Consider a scenario in which the calling application 103a to 103c communicates with the conference application management engine 211. At step 502, the conference application management engine 211 receives a conference request from the calling application 103a via the communication controller 290. At step 504, the conference application management engine 211 receives the conference request from the calling application 103b. At step 506, the conference application management engine 211 receives the conference request from the calling application 103c.

At step 508, the conference application management engine 211 after verifying the authorization of the calling application 103a to 103c, the conference application management engine 211 can determine the domain specific API configuration for the calling application 103a to 103c based on the received conference request. The domain specific API configuration includes the AI-assisted user interface. At step 510, the conference application management engine 211 transmits the domain specific API configuration associated with the calling application 103a to the calling application 103a.

At step 512, the conference application management engine 211 transmits the domain specific API configuration to the calling application 103b. At step 514, the conference application management engine 211 transmits the domain specific API configuration to the calling application 103c.

At step 516, the conference application management engine 211 establish a connection with the calling application 103a. At step 518, the conference application management engine 211 establish a connection with the calling application 103b. At step 520, the conference application management engine 211 establish a connection with the calling application 103c.

At step 522, the conference application management engine 211 determines the inactivity period in the AI-assisted user interface associated with the calling application 103. At step 524, if the inactivity period meets the inactivity threshold, then the conference application management engine 211 determines a topic content of a topic of discussion. The conference application management engine 211 determines the topic content based on the availability of the topic of discussion.

In an embodiment, if the topic of discussion is available, then the conference application management engine 211 automatically determines the topic content of the topic of discussion.

In an embodiment, if the topic of discussion is not available, then the conference application management engine 211 automatically determines the topic content of the topic of discussion by probing any one of the participant associated with the calling application 103a to 103c to set the topic of discussion in the AI-assisted conference.

At step 526, after determining the topic content of the topic of discussion, the conference application management engine 211 display the topic content to the calling application 103a via the AI-assisted user interface associated with the calling application 103a. At step 528, the conference application management engine 211 display the topic content to the calling application 103b via the AI-assisted user interface associated with the calling application 103b. At step 530, the conference application management engine 211 display the topic content to the calling application 103c via the AI-assisted user interface associated with the calling application 103c.

For example, consider the plurality of chatbots are connected with the master chatbot in the virtual conference to create a structural design of the car. The master chatbot automatically determines whether there is any interaction among the plurality of participants in the virtual conference. If there is no interaction in the virtual conference, then the master chatbot determines the topic content (i.e., designing a car structure) for the discussion based on e-mails and conference details, or requesting any one of the participant to set the topic content for the discussion. Further, the conference application display the topic of content to the participants through the AI-assisted user interface.

Figure 6:
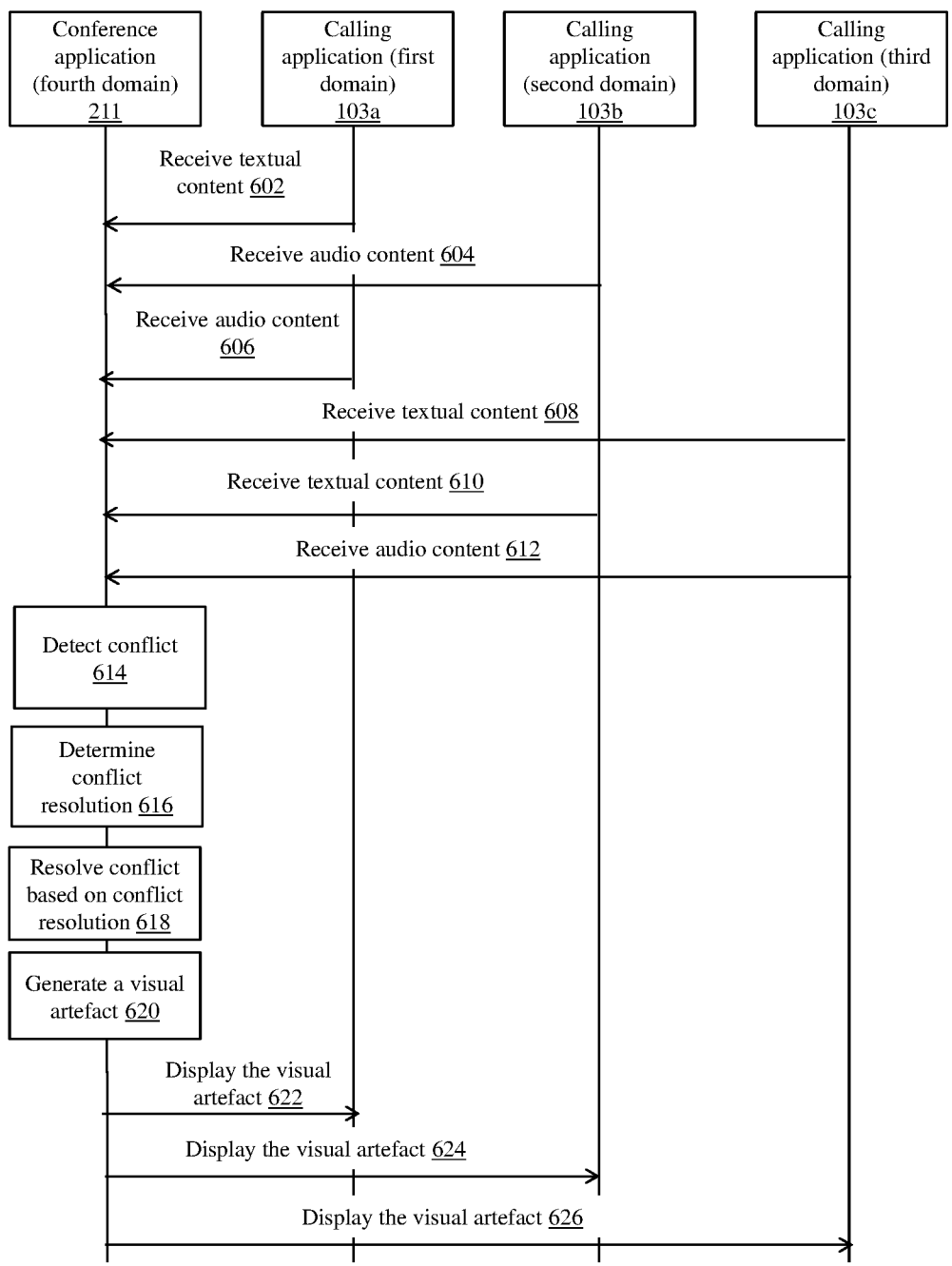
FIG. 6 illustrates a sequence diagram explaining various operations to determine a conflict between the plurality of calling applications in the AI-assisted conference, according to an embodiment as disclosed herein.

FIG. 6 illustrates a sequence diagram explaining various operations to determine a conflict between the calling application 103a to 103c in the AI-assisted conference, according to an embodiment as disclosed herein After establishing the connection between the calling application 103a to 103c and the conference application management engine 211, the conference application management engine 211 receives a textual content (e.g., written queries, or sentence, or words etc.) from the calling application 103a via the AI-assisted user interface (not shown) associated with the calling application 103a, at step 602.

At step 604, the conference application management engine 211 receives an audio content (e.g., voice, or speech of the participants.) from the calling application 103b via the audio interface 104 (not shown) associated with the calling application 103b. At step 606, the conference application management engine 211 receives the audio content from the calling application 103a via the audio interface 104 (not shown) associated with the calling application 103a. At step 608, the conference application management engine 211 receives a textual content from the calling application 103c via the AI-assisted user interface (not shown) associated with the calling application 103c.

At step 610, the conference application management engine 211 receives a textual content from the calling application 103b via the AI-assisted user interface (not shown) associated with the calling application 103b. At step 612, the conference application management engine 211 receives an audio content from the calling application 103c via the audio interface 104 (not shown) associated with the calling application 103c.

At step 614, the conference application management engine 211 detects the conflict of the audio contents of the calling application 103 in the AI-assisted conference. The conference application management engine 211 detects the conflict based on the conflict detection parameter.

In an embodiment, if the conference application management engine 211 detects the conflict of the audio contents of the calling application 103, then the conference application management engine 211 determines the conflict resolution to resolve the conflict, at step 616. The conference application management engine 211 determines the conflict resolution based on the plurality of conflict resolution parameters determined by the conference application management engine 211.

At step 618, the conference application management engine 211 resolves the conflict of the audio contents based on the conflict resolution. After resolving the conflict, the conference application management engine 211 compares the received textual contents and audio contents of the calling application 103 and generate the visual artefact of the topic of discussion, at step 620. The visual artefact is generated based on the topic content of the topic of discussion and the received audio and textual contents of the calling application 103.

At step 622, the conference application management engine 211 display the visual artefact in the AI-assisted user interface (not shown) associated with the calling application 103a. At step 624, the conference application management engine 211 display the visual artefact in the AI-assisted user interface (not shown) associated with the calling application 103b. At step 626, the conference application management engine 211 display the visual artefact in the AI-assisted user interface (not shown) associated with the calling application 103c.

For example, consider the plurality of chatbots are connected with the master chatbot in the virtual conference to create a structural design of the car. The plurality of participants interact with the other participants via the plurality of chatbots. The master chatbot monitors the textual and voice contents of the plurality of participants and detect whether there is any conflict between the voice contents of the plurality of participants during the conversation. If there is the conflict between the voice contents of the plurality of participants, then the master chatbot resolve the conflict based on conflict resolution parameters. Further, the master chatbot generate the structural design of the car based on the textual, voice contents of the plurality of participants and the topic content of the discussion.

Figure 7A:
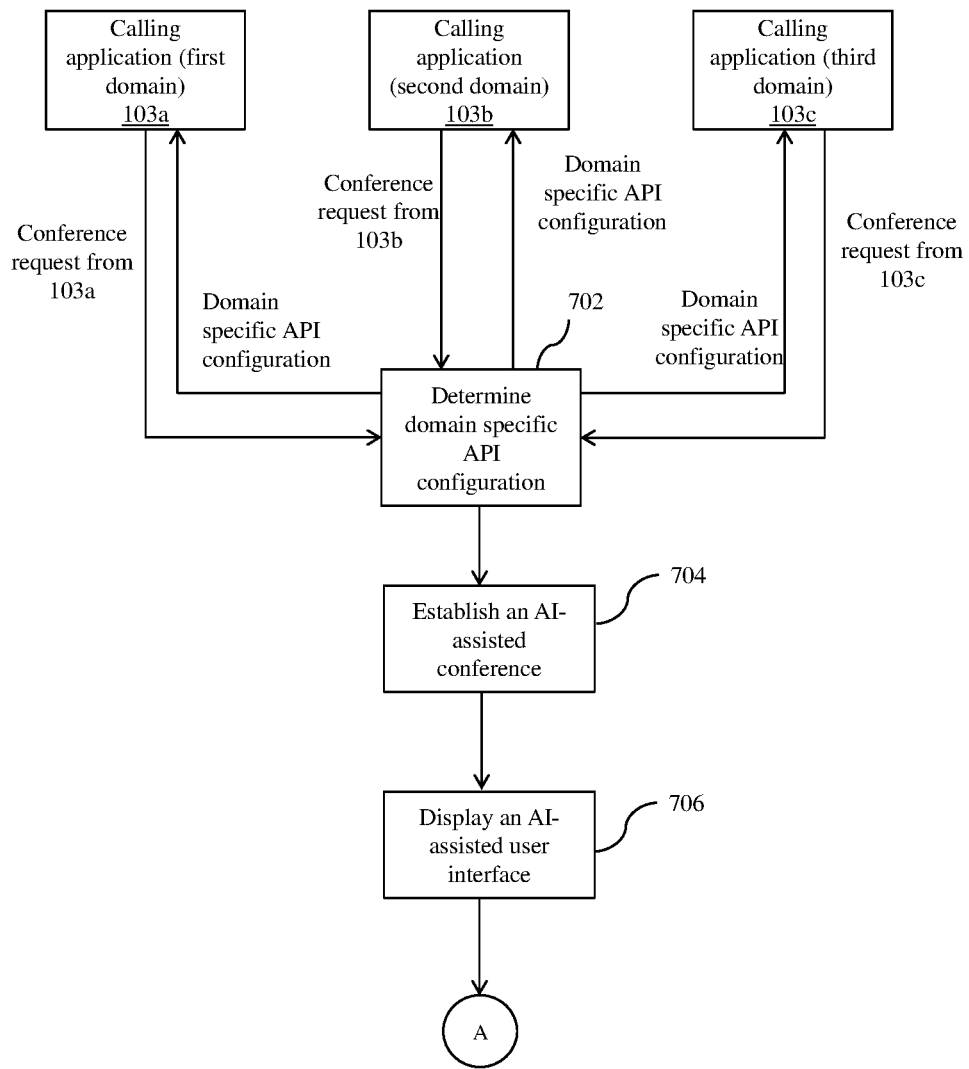
Figure 7C:
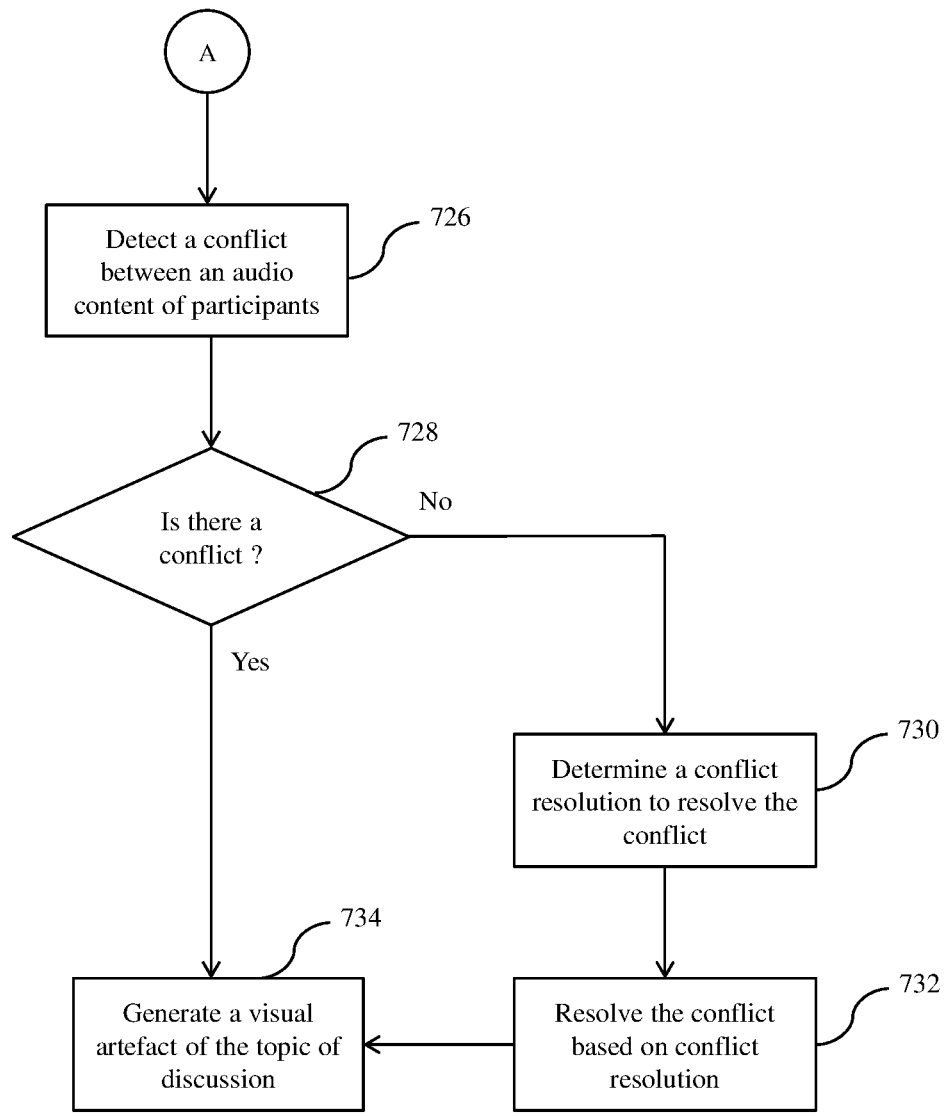

FIGS. 7A-7C are flow diagrams illustrating a method to provide the AI-assisted conference session with the plurality of calling devices 102a to 102c having a plurality of calling applications 103a to 103c associated with the different domains, according to an embodiment as disclosed herein.

In FIG. 7A, consider a scenario that the calling device 102a to 102c communicates with the conference device 200 through the network. At step 702, the method includes automatically determining the domain specific API configuration for the calling application 103a to 103c based on the conference requests received from the calling application 103a to 103c. In an embodiment, the method allows the conference application device 200 to receive the conference requests, via the communication controller 290 and further, the method allows domain specific API generator 213 to determine the domain specific API configuration for calling application 103a to 103c.

At step 704, the method includes establishing the AI-assisted conference session with the calling application 103a to 103c using the domain specific API configuration for the calling application 103a to 103c, where the conference application management engine 211 governs the calling application 103a to 103c during the AI-assisted conference. In an embodiment, the method allows the conference application device 200 to establish the AI-assisted conference session with the calling application 103a to 103c using the application programming interface configuration (API) for the calling application 103a to 103c.

At step 706, the method includes displaying the AI-assisted user interface having information about each participant associated with the calling application 103a to 103c. In an embodiment, the method allows the conference controller 210 to cause to display the AI-assisted user interface, via the display 230.

In FIG. 7B, at step 708, the method includes determining the inactivity period in the AI-assisted user interface. In an embodiment, the method allows the conference context detector 215 to determine the inactivity period in the AI-assisted user interface. At step 710, the method includes detecting that the inactivity period meets the inactivity threshold in the AI-assisted user interface. In an embodiment, the method allows the machine learning controller 220 to detect whether the inactivity period meets the inactivity threshold in the AI-assisted user interface.

At step 712, if the machine learning controller 220 detects the inactivity period does not meets the inactivity threshold in the AI-assisted user interface, then the conference application device 200 does not make any changes in the AI-assisted conference, at step 714. Alternatively, if the machine learning controller 220 detects the inactivity period meets the inactivity threshold in the AI-assisted user interface, then the method allows the conference context detector 215 to determine whether the topic of discussion is available in the AI-assisted conference, at step 716.

At step 718, if the conference context detector 215 detects that the topic of discussion is not available in the AI-assisted conference, then the method allows the conference context detector 215 to automatically probe any one participant in the AI-assisted user interface to set the topic of discussion in the AI-assisted conference, at step 720.

At step 722, the method includes determining topic content related to topic of discussion provided by any one of the participant in the AI-assisted user interface. In an embodiment, the method allows the recommendation engine 217 to determine the topic content related to topic of discussion provided by any one of the participant in the AI-assisted user interface.

Alternatively, if the conference context detector 215 detects that the topic of discussion is available in the AI-assisted conference, then the method directly allows the recommendation engine 217 to determine the topic content related to topic of discussion which is available in the AI-assisted conference, at step 722.

At step 724, the method includes displaying the topic content in the AI-assisted user interface. In an embodiment, the method allows the recommendation engine 217 to cause to display the topic content in the AI-assisted user interface, via the display 290.

In FIG. 7C, at step 726, the method includes detecting the conflict between the audio contents of the participants who speaks in the AI-assisted conference. In an embodiment, the method allows the speech extractor 214 to extract the audio contents of the participants who speaks in the AI-assisted conference session and further, the method allows the conflict management engine 218 to detect whether there is the conflict between the extracted audio contents of the participants.

At step 728, if the conflict management engine 218 detects the conflict between the audio contents of the participants, then the method allows the conflict management engine 218 to determine the conflict resolution to resolve the conflict between the audio contents of the participants, at step 730.

At step 732, the method includes resolving the conflict between the audio content of the participants based on the conflict resolution. In an embodiment, the method allows the conflict management engine 218 to resolve the conflict between the audio content of the participants based on the conflict resolution.

At step 734, the method includes generating the visual artefact of the topic of discussion, where the visual artefacts include the topic content displayed in the AI-assisted user interface and the audio content spoken by the participants in the AI-assisted conference. In an embodiment, the method allows the visual artefact generator 219 to generate the visual artefact of the topic of discussion, where the visual artefacts include the topic content displayed in the AI-assisted user interface and the audio content spoken by the participants in the AI-assisted conference.

Alternatively, if the conflict management engine 218 detects there is no conflict between the audio contents of the participants, then the method directly allows the visual artefact generator 219 to generate the visual artefact of the topic of discussion based on the audio contents spoken by the participants, at step 734.

FIG. 8 is a flow chart diagram 800 illustrating various operations to detect a conflict between the audio content of participants who speaks in the AI-assisted conference session and determine the conflict resolution to resolve the conflict, according to the embodiment as disclosed herein. At step 802, the method includes monitoring the audio content of participants who speaks in the AI-assisted conference. In an embodiment, the method allows the conflict management engine 218 to monitor the audio content of the participants who speaks in the AI-assisted conference.

At step 804, the method includes analyzing audio content from each of participants based on the conflict detection parameter. In an embodiment, the method allows the conflict management engine 218 to analyse the audio content from each participant based on the conflict detection parameter.

At step 806, the method includes detecting the conflict between audio content of the participants. In an embodiment, the method allows the conflict management engine 218 to detect the conflict between the audio content of the participants. At step 808, the method includes computing the qualification level for each of participants based on a plurality of conflict resolution parameters. In an embodiment, the method allows the conflict management engine 218 to compute the qualification level for each of participants based on a plurality of conflict resolution parameters.

In an embodiment, the plurality of conflict resolution parameters includes the participant context such as participant role (Ur), the level of expertise (Ue), the relevance of input provided by the participant in the AI-assisted conference session (Rc). The participant contexts are determined by the participant context detector 216. During the conflict between the audio contents of the participants, the conflict management engine 218 adds the weightage value for the participant contexts of the participants. Further, the conflict management engine 218 computes the qualification level by summing all the weightage values of the participant contexts of the participants. The qualification level is given by QL=AUr+BUe+CRc where, A, B, C are the weightage values for the participant.

In an embodiment, if the qualification level of two participants are same, then the conflict management engine 218 resolves the conflict based on a number of textual and audio contents provided by any one of the participant which are relevant to the topic of discussion.

In another embodiment, if the qualification level of two participants are same, then the conflict management engine 218 resolves the conflict based on lottery.

At step 810, the method includes comparing the qualification level for each of participant. In an embodiment, the method allows the conflict management engine 218 to compare the qualification level for each of participant. At step 812, the method includes determining the conflict resolution by selecting the audio content of the participant having higher qualification level. In an embodiment, the method allows the conflict management engine 218 to determine the conflict resolution by selecting the audio content of the participant having higher qualification level.

The embodiments disclosed herein can be implemented through at least one software program running on at least one hardware device and performing network management functions to control the elements. The elements shown in the FIGS. 1 through 8 include blocks which can be at least one of a hardware device, or a combination of hardware device and software module.

The foregoing description of the embodiments will so fully reveal the general nature of the embodiments herein that others can, by applying current knowledge, readily modify or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for providing an Artificial Intelligence (AI)-assisted conference system, the method comprising:

receiving, by a conference controller, a first conference request associated with a topic from a first calling application to establish an AI-assisted conference session, wherein the first calling application is associated with a first domain;

receiving, by the conference controller, a second conference request associated with the topic from a second calling application to establish the AI-assisted conference session, wherein the second calling application is associated with a second domain different from the first domain;

receiving, by the conference controller, a third conference request associated with the topic from a third calling application to establish an AI-assisted conference session, wherein the third calling application is associated with a third domain different from the first domain and the second domain;

detecting, by the conference controller, the first domain based on the first conference request, the second domain based on the second conference request, and the third domain based on the at least one third conference request;

automatically determining, by the conference controller, a first domain specific Application Programming Interface (API) configuration for the first calling application based on the first domain, a second domain specific API configuration for the second calling application based on the second domain, and a third domain specific API configuration for the third calling application based on the third domain;

establishing, by the conference controller, the AI-assisted conference session with:
　the first calling application using the first domain specific API configuration,
　the second calling application using the second domain specific API configuration, and
　the third calling application using the third domain specific API configuration, wherein the conference controller governs the first, second and third calling applications during the AI-assisted conference session; and causing, by the conference controller, to display an AI-assisted user interface displaying information about participants associated with the first, second and third calling applications;

automatically generating, by the conference controller, a visual artefact comprising the topic content related to the topic displayed in the AI-assisted user interface during the AI-assisted conference session and audio contents spoken by the participants in the AI-assisted conference session;

detecting, by the conference controller, a conflict between an audio content of at least two participants who speak in the AI-assisted conference session;

determining, by the conference controller, a conflict resolution to resolve the conflict based on a plurality of conflict resolution parameters; and resolving, by the conference controller, the conflict between the audio content of the at least two participants based on the conflict resolution.

2. The method of claim 1, wherein the conference controller governs the first, second and third calling applications during the AI-assisted conference session based on a plurality of policies.

3. The method of claim 1, comprising:

determining, by the conference controller, an inactivity period in the AI-assisted user interface during the AI-assisted conference session;

detecting, by the conference controller, that the inactivity period meets an inactivity threshold;

automatically determining, by the conference controller, whether the topic of discussion is available; and performing, by the conference controller, one of:

automatically determining a topic content related to the topic of discussion in response to determining that the topic of discussion is available, and displaying the topic content in the AI-assisted user interface during the AI-assisted conference session, and automatically probing at least one of the participants in the AI-assisted user interface to set the topic of discussion in the AI-assisted conference session in response to determining that the topic of discussion is unavailable, automatically determining content related to the topic of discussion, and display the topic content in the AI-assisted user interface during the AI-assisted conference session.

4. The method of claim 1, wherein the topic content comprising at least one of a selectable media element and an actionable media element related to the topic of discussion, wherein the topic content related to the topic of discussion is dynamically determined based on at least one of social handles associated with each of the participants.

5. The method of claim 3, wherein the at least one of the participants is probed by providing at least one indication in the AI-assisted user interface indicating the at least one of the participants to set the topic of discussion in the AI-assisted conference session, wherein the at least one of the participants to be probed is dynamically determined based on the social handles associated with each of the participants.

6. The method of claim 1, detecting the conflict between the audio content of the at least two participants who speak in the AI-assisted conference session comprising: monitoring, by the conference controller, the audio content of participants who speak in the AI-assisted conference session; analyzing, by the conference controller, the audio content from each of the plurality of audio conference participants based on a conflict detection parameter; and detecting, by the conference controller, the conflict between the audio content of the at least two participants based on the analyzing.

7. The method of claim 6, wherein the conflict detection parameter comprises at least one of a level of divergence in inputs provided by the participants who speak in the AI-assisted conference session, a number of opinions placed for a common topic by the participants who speak in the AI-assisted conference session, and a number of times a participant speaks with other participant in the AI-assisted conference session.

8. The method of claim 1, wherein the plurality of conflict resolution parameters comprises a participant role, a level of expertise of a participant in the topic of discussion, and a degree of relevance of input of a participant with the topic of discussion, wherein the participant role is dynamically determined based on a number of references of the participant and a number of endorsements to the participant, wherein the level of expertise of a participant in the topic of discussion is dynamically determined based on a contribution of the participant in the topic of discussion, wherein the degree of relevance of input of a participant with the topic of discussion is dynamically determined based on alternatives of the input, a context of the topic of discussion and a context of the input of the participant.

9. The method of claim 1, determining the conflict resolution to resolve the conflict based on the plurality of conflict resolution parameters comprising: computing a qualification level for each participant of the at least one or two participants based on the plurality of conflict resolution parameters; comparing the qualification level of each participant of the at least one or two participants among each other; and determining the conflict resolution by selecting an audio content of a participant from the at least two participants having a highest qualification level.

10. The method of claim 1, wherein automatically generating the visual artefact comprising the topic content displayed in the AI-assisted user interface and the audio content spoken by the participants in the AI-assisted conference session comprises:

determining, by the conference controller, a context of the AI-assisted conference session based on interaction among plurality of participants during the AI-assisted conference session;

determining, by the conference controller, a context of the participants based on interaction among plurality of participants during the AI-assisted conference session; and creating, by the conference controller, the visual artefact based on the context of the AI-assisted conference session and the context of the participants.

11. The method of claim 1, wherein automatically generating the visual artefact comprises:

causing, by the conference controller, to display a topic content related to the topic of discussion in the AI-assisted conference session selected by at least one of the participants;

monitoring, by the conference controller, an audio content of the participants who speak in the AI-assisted conference session;

analyzing, by the conference controller, the audio content from each of the participants; and automatically generating, by the conference controller, the visual artefact of the topic of discussion based on the analysis, wherein the visual artefact comprising the topic content displayed in the AI-assisted user interface and the audio content spoken by the participants in the AI-assisted conference session.

12. An Artificial Intelligence (AI)-assisted conference system, comprising:

a display;

a memory;

a processor; and a conference controller, operably coupled to the processor and the memory, configured to:

receive a first conference request associated with a topic from a first calling application to establish an AI-assisted conference session, wherein the first calling application is associated with a first domain;

receive a second conference request associated with the topic from a second calling application to establish the AI-assisted conference session, wherein the second calling application is associated with a second domain different from the first domain;

receive a third conference request associated with the topic from a third calling application to establish an AI-assisted conference session, wherein the third calling application is associated with a third domain different from the first domain and the second domain;

detect the first domain based on the first conference request, the second domain based on the second conference request, and the third domain based on the at least one third conference request;

automatically determine a first domain specific Application Programming Interface (API) configuration for the first calling application based on the first domain, a second domain specific API configuration for the second calling application based on the second domain, and a third domain specific API configuration for the third calling application based on the third domain;

establish, the AI-assisted conference session with:
the first calling application using the first domain specific API configuration,
the second calling application using the second domain specific API configuration, and
the third calling application using the third domain specific API configuration, wherein the conference controller governs the first, second and third calling applications during the AI-assisted conference session; and cause to display an AI-assisted user interface displaying information about participants associated with the first, second and third calling applications;

automatically generate a visual artefact comprising the topic content related to the topic displayed in the AI-assisted user interface during the AI-assisted conference session and audio contents spoken by the participants in the AI-assisted conference session; and wherein the conference controller is configured to:
detect a conflict between an audio content of at least two participants who speak in the AI-assisted conference session;
determining, by the conference controller, a conflict resolution to resolve the conflict based on a plurality of conflict resolution parameters; and
resolving, by the conference controller, the conflict between the audio content of the at least two participants based on the conflict resolution.

13. The AI-assisted conference system of claim 12, wherein the conference controller governs the first, second and third calling applications during the AI-assisted conference session based on a plurality of policies.

14. The AI-assisted conference system of claim 12, wherein the conference controller is configured to:
determine an inactivity period in the AI-assisted user interface during the AI-assisted conference session;
detect that the inactivity period meets an inactivity threshold;
automatically determine whether the topic of discussion is available; and
perform one of:
automatically determine a topic content related to the topic of discussion in response to determining that the topic of discussion is available, and displaying the topic content in the AI-assisted user interface during the AI-assisted conference session, and
automatically probe at least one of the participants in the AI-assisted user interface to set the topic of discussion in the AI-assisted conference session in response to determining that the topic of discussion is unavailable, automatically determining content related to the topic of discussion, and display the topic content in the AI-assisted user interface during the AI-assisted conference session.

15. The AI-assisted conference system of claim 12, wherein the topic content comprising at least one of a selectable media element and an actionable media element related to the topic of discussion, wherein the topic content related to the topic of discussion is dynamically determined based on at least one of social handles associated with each of the participants.

16. The AI-assisted conference system of claim 14, wherein the at least one of the participants is probed by providing at least one indication in the AI-assisted user interface indicating the at least one of the participants to set the topic of discussion in the AI-assisted conference session, wherein the at least one of the participants to be probed is dynamically determined based on the social handles associated with each of the participants.

17. The AI-assisted conference system of claim 12, detect conflict between the audio content of the at least two participants who speak in the AI-assisted conference session comprising: monitor the audio content of participants who speak in the AI-assisted conference session; analyze the audio content from each of the plurality of audio conference participants based on a conflict detection parameter; and detect the conflict between the audio content of the at least two participants based on the analysis.

18. The AI-assisted conference system of claim 17, wherein the conflict detection parameter comprises at least one a level of divergence in inputs provided by the participants who speaks in the AI-assisted conference session, a number of opinions placed for a common topic by the participants who speaks in the AI-assisted conference, and a number of times a participant speaks with other participant in the AI-assisted conference session.

19. The AI-assisted conference system of claim 12, wherein the plurality of conflict resolution parameters comprises a participant role, a level of expertise of a participant in the topic of discussion, and a degree of relevance of input of a participant with the topic of discussion, wherein the participant role is dynamically determined based on a number of references of the participant and a number of endorsements to the participant, wherein the level of expertise of a participant in the topic of discussion is dynamically determined based on a contribution of the participant in the topic of discussion, wherein the degree of relevance of input of a participant with the topic of discussion is dynamically determined based on alternatives of the input, a context of the topic of discussion and a context of the input of the participant.

20. The AI-assisted conference system of claim 17, wherein determining the conflict resolution to resolve the conflict based on the plurality of conflict resolution parameters comprising:

compute a qualification level for each participant of the at least one or two participants based on the plurality of conflict resolution parameters;

compare the qualification level of each participant of the at least one or two participants among each other; and determine the conflict resolution by selecting an audio content of a participant from the at least two participants that has a highest qualification level.

21. The AI-assisted conference system of claim 12, wherein automatically generate the visual artefact comprising the topic content displayed in the AI-assisted user interface and the audio content spoken by the participants in the AI-assisted conference session comprises:

determine a context of the AI-assisted conference session based on interaction among plurality of participants during the AI-assisted conference session;

determine a context of the participants based on interaction among plurality of participants during the AI-assisted conference session; and create the visual artefact based on the context of the AI-assisted conference session and the context of the participants.

22. The AI-assisted conference system of claim 12, wherein automatically generating the visual artefact comprises:

cause to display a topic content related to the topic of discussion in the AI-assisted conference session selected by at least one of the participants;

monitor an audio content of the participants who speak in the AI-assisted conference session;

analyze the audio content from each of the participants; and automatically generate the visual artefact of the topic of discussion based on the analysis, wherein the visual artefact comprising the topic content displayed in the AI-assisted user interface and the audio content spoken by the participants in the AI-assisted conference session.

* * * * *